April 3, 1962
W. RICHTER
3,028,553
VOLTAGE AMPLITUDE DISCRIMINATING SYSTEM HAVING PULSE WIDTH STRETCHING MEANS
Filed Sept. 4, 1959
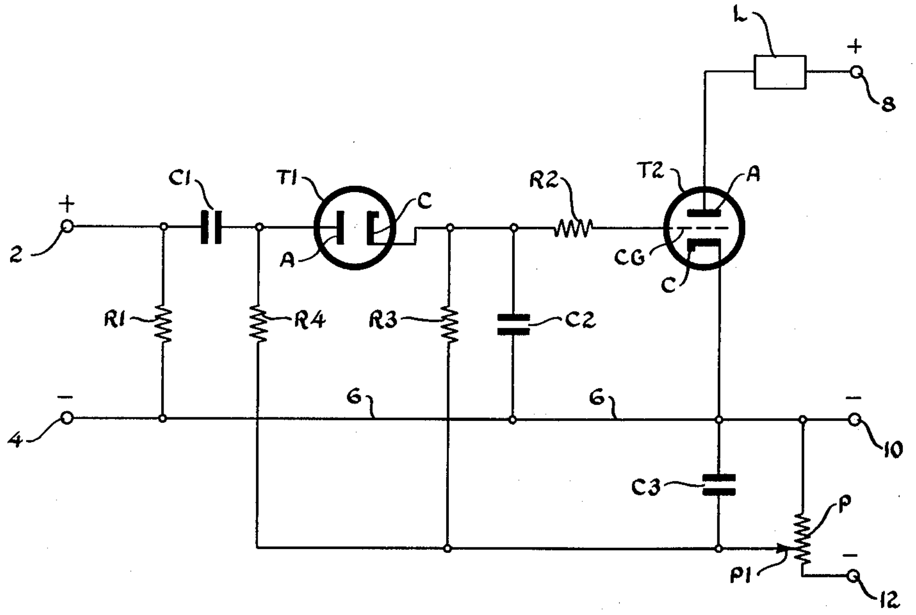
Inventor
Walther Richter
By Wm. A. Autio
Attorney United States Patent Office 3,028,553

Patented Apr. 3, 1962

3,028,553

VOLTAGE AMPLITUDE DISCRIMINATING SYSTEM HAVING PULSE WIDTH STRETCHING MEANS

Walther Richter, River Hills, Wis., assignor to Cutler-Hammer, Inc., Milwaukee, Wis., a corporation of Delaware Filed Sept. 4, 1959, Ser. No. 838,185
2 Claims. (Cl. 328—115)

This invention relates to a voltage discriminating system and more particularly to a circuit which discriminates between different amplitudes of voltage.

While not limited thereto, the invention is especially applicable to operating a load in response to a short input voltage pulse having a value at or higher than a predetermined amplitude and for preventing operation of such load when the amplitude of the input voltage pulse is below such predetermined value. By short input voltage pulse is meant a pulse that is short compared to the time required to operate the load. That is, the length of the input pulse is shorter than that which would normally be required to operate a given load even if its amplitude is at or higher than the aforementioned predetermined amplitude. For a specific application of the invention in a testing system, reference may be had to Merle R. Swinehart copending application Serial No. 838,111 filed September 4, 1959.

A general object of the invention is to provide an improved voltage pulse discriminator circuit.

A more specific object of the invention is to provide a voltage pulse discriminator circuit which is simple in construction and reliable in operation.

Another specific object of the invention is to provide an improved voltage pulse discriminator circuit which is capable of operating a given load only when the amplitude of such pulse is at or above a predetermined value wherein the length of such pulse is short compared to the operating time of the load.

Another specific object of the invention is to provide a voltage discriminator circuit of the aforementioned type which is capable of operating a given load in response to an input voltage pulse that is shorter than the normal operating time of the load and which circuit is adjustable to respond to a desired amplitude of input voltage pulse.

Other objects and advantages of the invention will hereinafter appear.

While the apparatus hereinafter described is effectively adapted to fulfill the objects stated, I do not intend to confine my invention to the particular preferred embodiment of voltage discriminator circuit disclosed, inasmuch as it is susceptible of various modifications without departing from the scope of the appended claims.

The invention will now be described in detail with reference to the accompanying drawing which diagrammatically shows a voltage discriminator circuit constructed in accordance with the invention.

Referring to the single FIGURE of the drawing, there is shown a voltage discriminator circuit having input terminals 2 and 4 connected across an input resistor R1. Input terminal 2 is also connected through a coupling capacitor C1, the anode A and cathode C in that order of a rectifying diode T1 and a resistor R2 to the control grid CG of a triode power amplifier electric discharge device T2. The junction between resistor R2 and cathode C of diode T1 is connected through a sustaining capacitor C2 and a common conductor 6 to input terminal 4. Anode A of discharge device T2 is connected through a load L such as an electroresponsive relay, counter operating coil or other energizable device to the positive side 8 of a direct current supply voltage source as indicated by the positive symbol. Cathode C of discharge device T2 is connected to an intermediate voltage point 10 in such direct current source as indicated by the negative symbol. Cathode C of discharge device T2 is also connected through common conductor 6 to input terminal 4.

The resistor element of a potentiometer P is connected between intermediate point 10 and the negative side 12 of the direct current source to provide negative bias voltage to control grid CG of discharge device T2. Tap P1 of potentiometer P is adjustable and is connected through a resistor R3 to the junction between resistor R2 and cathode C of diode T1 to supply negative bias voltage through resistor R2 to control grid CG. The junction between capacitor C1 and anode A of diode T1 is connected through a resistor R4 to tap P1. Resistors R3 and R4 provide discharge paths for capacitors C1 and C2 as hereinafter described. A filter capacitor C3 is connected across potentiometer P between common conductor 6 and tap P1 because the voltage across potentiometer P is preferably supplied from a rectified alternating current source as shown in the aforementioned copending application.

It will be apparent that in the circuit described, anode voltage is supplied to discharge device T2 from positive terminal 8 through load L and then through anode A and cathode C of discharge device T2 to negative terminal 10. Tap P1 of potentiometer P is adjusted so that control grid CG of discharge device T2 is maintained at negative cutoff voltage in a circuit extending from tap P1 through resistors R3 and R2 to such control grid. The setting of tap P1 determines the critical input voltage at or above which discharge device T2 will be rendered conducting to energize the load and below which discharge device T2 will not be rendered conducting.

Let it be assumed that a short input voltage pulse having a predetermined amplitude sufficient to render discharge device T2 conducting is applied to input terminals 2 and 4. This pulse appears as a voltage drop across resistor R1 and is applied through coupling capacitor C1, diode T1 and resistor R2 to the control grid of discharge device T2 to render the latter conducting. As a result of the voltage drop across resistor R1, current flows in a circuit extending from the upper end thereof through capacitor C1, diode T1 and capacitor C2 to the lower end of resistor R1 to charge capacitor C2. The function of capacitor C2 is to charge as aforementioned to maintain a positive voltage on the control grid of discharge device T2. This positive voltage counteracts the negative bias voltage applied to the control grid from potentiometer P to maintain discharge device T2 conducting for a sufficient period of time to enable load L to operate. The function of diode T1 is to isolate the control grid circuit of discharge device T2 from the input circuit when the voltage in the latter decreases in value. Thus, diode T1 permits current flow therethrough in response to the input voltage pulse to charge capacitor C2 but effectively prevents current flow in the opposite direction at the end of the input pulse when the voltage at terminal 2 decreases to a value less than the voltage across capacitor C2. As a result, diode T1 prevents the control grid voltage of discharge device T2 from decreasing before load L has had time to operate. Following operation of load L, capacitor C2 discharges in a circuit extending from the upper side thereof through resistor R3, tap P1 and the upper portion of the resistor element of potentiometer P and conductor 6 to the lower side of capacitor C2.

The function of coupling capacitor C1 is to increase the voltage at anode A of diode T1 in response to a positive input voltage pulse. Anode A of diode T1 is normally maintained at the same negative voltage as control grid CG of discharge device T2 in the circuit extending from tap P1 of potentiometer P through resistor R4. When a short positive voltage pulse is applied from terminal 2 to the left-hand side of capacitor C1, the latter does not have time to charge during this short time interval. As a result, the voltage at the right-hand side of capacitor C1 increases in accordance with the input pulse. As a result, this increased voltage is applied through diode T1 and resistor R2 to control grid CG of discharge device T2 to render the latter conducting. Capacitor C2 has a substantially smaller capacitive value than capacitor C1. Therefore, the aforementioned increase in voltage at anode A of diode T1 causes current flow through the diode to charge capacitor C2. Resistors R3 and R4 have sufficient large values to prevent significant current flow therethrough in shunt of capacitor C2 during the input pulse. Diode T1 blocks discharge of capacitor C2 at the end of the input pulse. The RC time constant of resistor R3 and capacitor C2 is of a value to maintain discharge device T2 conducting for a period of time sufficient to cause operation of load L. It will be apparent that adjustment of tap P1 of potentiometer P will cause a corresponding adjustment in the control grid bias voltage of discharge device T2. Such adjustment of tap P1 will also cause a corresponding adjustment of the voltage at the right-hand side of capacitor C1. Moreover, the input pulse will always cause the voltage at the right-hand side of capacitor C1 to increase from the value set at the tap P1 of potentiometer P regardless of such setting. It will, therefore, be apparent that tap P1 of potentiometer P can be used to preset the system so that load L will respond to any desired amplitude of input voltage pulse and will not respond to an input voltage pulse having an amplitude less than the preset value. Any charge on capacitor C1 can leak off through resistor R1, conductor 6, the upper portion of the resistor element of potentiometer P and tap P1 and resistor R4.

I claim:

1. In a system for discriminating between short voltage pulses having amplitudes above and below a predetermined value, in combination, a power supply source, a load, amplifier means connected in circuit with said load across said source, said amplifier means comprising a control element and being operable to control energization of said load, means for applying an adjustable bias voltage to said control element to render said load normally unenergized, means for applying input voltage pulses of varying amplitude to said control element comprising first and second input terminals and a capacitor and a unidirectional conducting device, said capacitor and unidirectional conducting device being connected in series in that order between said first input terminal and said control element, means for applying said adjustable bias voltage to the junction of said capacitor and said unidirectional conducting device, said input voltage pulses each having a short duration which is insufficient to cause charging of said capacitor whereby the voltage at the junction of said capacitor and said unidirectional conducting device changes in response to and in accordance with each input voltage pulse in opposition to the bias voltage thereat and such voltage change is applied through said unidirectional conducting device to said control element as an operating voltage in opposition to said bias voltage thereon, the duration of each input voltage pulse being insufficient to maintain an operating voltage on said control element for a time interval sufficient to cause energization of said load, a second capacitor connected between said control element and said second input terminal, said second capacitor having a capacitive value affording charging thereof in response to each said voltage change, said unidirectional conducting device being poled to prevent discharge of said second capacitor therethrough when the voltage at the junction of the first mentioned capacitor and said unidirectional conducting device returns toward said bias voltage value at the end of each input pulse, and a discharge circuit for said second capacitor having a resistor of a sufficient value to limit discharge of said second capacitor whereby to maintain an operating voltage on said control element for a time interval sufficient to cause energization of said load provided each corresponding input voltage pulse has an amplitude above said predetermined value.

2. In a system for discriminating between short unidirectional voltage pulses having different amplitudes, in combination, a direct current power supply source, a load, an electric discharge device having an anode and a cathode connected in series with said load across said source, said discharge device further having a control electrode for controlling conduction thereof to control energization of said load, means applying a predetermined value of negative bias voltage across said control electrode and said cathode to render said load normally unenergized, means for applying positive input voltage pulses of varying amplitude across said control electrode and cathode comprising positive and negative input terminals and a capacitor and a unidirectional conducting device, said capacitor and unidirectional conducting device being connected in series in that order between said positive input terminal and said control electrode and said negative input terminal being connected to said cathode, means applying said value of negative bias voltage to the junction between said capacitor and said unidirectional conducting device, said input voltage pulses each having a short duration which is insufficient to cause charging of said capacitor whereby the voltage at said junction increases from said negative bias value in response to and in accordance with each positive input voltage pulse and such voltage increase is applied through said unidirectional conducting device across said control electrode and said cathode to operate said discharge device, the duration of each positive input voltage pulse being insufficient to maintain an operating voltage on said discharge device for a time interval sufficient to cause energization of said load, a second capacitor connected in shunt of said control electrode and said cathode, said second capacitor having a capacitive value affording charging thereof in response to each said voltage increase, said unidirectional conducting device being poled to prevent discharge of said second capacitor therethrough when the voltage at said junction decreases toward said negative bias value at the end of each positive input voltage pulse, a discharge circuit for said second capacitor having a resistor connected therein of a value to limit discharge of said second capacitor whereby to maintain an operating voltage across said control electrode and said cathode for a time interval sufficient to cause energization of said load provided each corresponding positive input voltage pulse has an amplitude above a predetermined value, and means for selectively adjusting said negative bias voltage to cause energization of said load in response to each positive input voltage pulse having an amplitude above a different value.

References Cited in the file of this patent

UNITED STATES PATENTS

| | | |
|---|---|---|
| 2,472,209 | Hall | June 7, 1949 |
| 2,497,693 | Shea | Feb. 14, 1950 |
| 2,802,101 | West et al. | Aug. 6, 1957 |
| 2,912,579 | Bates | Nov. 10, 1959 |
| 2,975,366 | Young | Mar. 14, 1961 |

OTHER REFERENCES

Millman et al.: Pulse and Digital Circuits, 1956, pages 426–427.